United States Patent [19]
Mizrahi

[11] Patent Number: 6,002,503
[45] Date of Patent: Dec. 14, 1999

[54] OPTICAL ADD/DROP MULTIPLEXER

[75] Inventor: Victor Mizrahi, Columbia, Md.

[73] Assignee: CIENA Corporation, Linthicum, Md.

[21] Appl. No.: 08/956,807

[22] Filed: Oct. 23, 1997

[51] Int. Cl.[6] .................................................. H04J 14/02
[52] U.S. Cl. .............................. 359/124; 359/119; 385/24
[58] Field of Search ..................................... 359/124, 127, 359/119; 385/24

[56] References Cited

U.S. PATENT DOCUMENTS

| | | | |
|---|---|---|---|
| 5,532,864 | 7/1996 | Alexander et al. | 359/177 |
| 5,760,934 | 6/1998 | Sutter et al. | 359/119 |
| 5,812,291 | 9/1998 | Bendelli et al. | 359/127 |

FOREIGN PATENT DOCUMENTS

| | | |
|---|---|---|
| 05100254 | 4/1993 | European Pat. Off. . |
| 9706614 | 2/1997 | WIPO . |

OTHER PUBLICATIONS

Giles, C. R., et al.; "Low–Loss Add/Drop Multiplexes for WDM Lightwave Networks"; Proceedings IOOC International Conference on Integrated Optics and Optical Fibre Communication; 1995; pp. 66/67.

Glance, B.; "Wavelength–Tunable Add/Drop Optical Filter"; IEEE Photonics Technology Letters, vol. 8, No. 2; Feb. 1996; pp. 245–247.

Notification of Transmittal of The International Search Report or The Declaration, 7 pages.

DiCon Fiberoptics, Inc., "'96–'97 Product Catalog," Nov. 1996, Cover page and pp. 25–26 (Narrowband Filter WDM).

*Primary Examiner*—Kinfe-Michael Negash
*Attorney, Agent, or Firm*—Daniel N. Daisak; David L. Soltz

[57] ABSTRACT

In accordance with the present invention, a WDM communication signal including a service channel is received by an add/drop multiplexer. An optical filter element included in the multiplexer separates a first optical payload channel and the service channel from the WDM signal and outputs these signals on a first output port. The remaining WDM channels exit the optical filter at a second output. By utilizing this add/drop multiplexer to select both an optical channel and a service channel, the total power loss associated with a communications network is significantly less than that obtained from networks having separate components to add/drop an optical payload channel and a service channel.

26 Claims, 4 Drawing Sheets

OPTICAL ADD/DROP MULTIPLEXER

FIELD OF INVENTION

The present invention relates generally to optical communication systems and more particularly to a system and apparatus for adding/dropping a service channel and an information bearing optical signal within a communications network.

BACKGROUND OF INVENTION

Wavelength Division Multiplexing (WDM) is used to transmit a plurality of optical channels via an optical waveguide medium where each channel carries information signals within a network or system. Each channel within the WDM signal is associated with a particular wavelength, thereby increasing the information capacity of fiber optic systems. Such optical systems include, for example, local area networks (LANs), telecommunication systems and cable television systems. Depending on the optical system configuration and the transmission path, various optical and/or electrical amplifiers are required to provide the necessary optical power to efficiently transmit and amplify the WDM signal to each component within the network.

WDM optical networks have traditionally been used for long haul point to point networks. However, with the increasing demands on communication systems, WDM optical networks can also be used in smaller system configurations, such as local telephone or data networks. In these systems, communication signals are usually transmitted over a limited geographic area to various nodes within a network. A particular node can be configured to drop one or more information bearing or payload channels from the WDM signal, process the information contained in the dropped channels and add the channels containing new information to the WDM signal for transmission to other nodes in the network. An optical multiplexer present at each node may be used to drop the particular channel from the WDM signal and subsequently add the channel back to the WDM signal prior to transmission to another network node.

Because the transmission distance between nodes in these types of networks is relatively small, optical amplifiers are avoided in order to reduce the cost of the network. However, each optical component introduces optical power loss, measured in dBs. For example, the use of a fused fiber optical coupler may contribute a 3 dB loss to the transmission signal. This loss can accumulate among the various network components, but cannot exceed a predetermined power loss budget associated with the network configuration.

A service channel, usually outside the information bearing or payload channel bandwidth, is preferably included in these optical systems for carrying system housekeeping information, for example network monitoring and control signals as well as telemetry information, to and/or from nodes in the network. Because the service channel wavelength is outside the payload channel bandwidth, separate components configured to receive and process the service channel are required. These service channel specific components increase the power loss within the network unrelated to the payload channels where the extra loss is seen by the through channels passing to other network nodes. Moreover, these service channel components negatively impact the loss budget associated with the network.

Thus, there is a need to reduce the power loss associated with optical networks by combining the use of service channel components with payload channel components within an optical WDM network. There is also a need to provide these components at reduced expense.

SUMMARY OF INVENTION

The invention meets these needs and avoids the above-referenced drawbacks by providing an optical device which includes an optical filtering element having an input, and first and second outputs. The input of the filtering element is coupled to the first transmission path for receiving an optical signal having a plurality of channels including a service channel. The first output carries at least one of the plurality of optical channels and the service channel. The second output carries at least a second one of the plurality of optical channels.

DETAILED DESCRIPTION

In accordance with the present invention, a plurality of nodes define an optical communications network. An add/drop multiplexer located at each node receives a WDM communication signal having a plurality of optical channels. A first filtering element utilized in each of the add/drop multiplexers drops or selects both a wavelength associated with a particular payload channel and a second wavelength associated with a service channel used within the network. The channel wavelengths not dropped by the particular multiplexer are allowed to pass through the add/drop multiplexer unaffected. Although the add/drop multiplexer in accordance with the present invention introduces an optical power loss to a network, the use of a single filtering element configured to drop both a service channel wavelength and a payload channel wavelength reduces the amount of optical power loss which would otherwise be imposed by separate components. Moreover, this reduced power loss lessens the impact on the through channels within the network and consequently has a positive effect on the network's loss budget.

Figure 1:
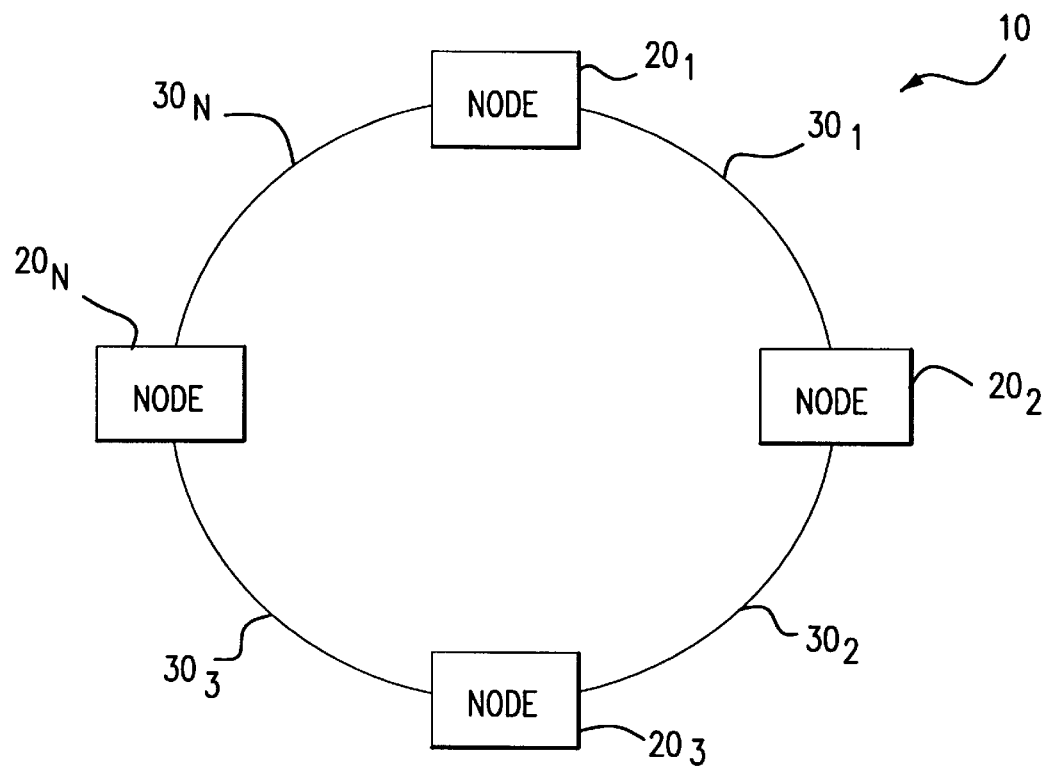
FIG. 1 illustrates a schematic diagram of an optical network utilizing an optical device in accordance with the present invention.

Turning to the drawings in which like reference characters indicate the same or similar elements, FIG. 1 schematically illustrates a simplified optical network 10 having a plurality of nodes $20_1, 20_2, 20_3 \ldots 20_N$ and corresponding optical paths $30_1, 30_2, 30_3 \ldots 30_N$ therebetween where N corresponds to the number of network nodes. Each node $20_1, 20_2, 20_3 \ldots 20_N$ may, for example, represent separate geographical locations within network 10. The optical paths $30_1, 30_2, 30_3 \ldots 30_N$ carry a wavelength division multiplexed communication signal including a plurality of payload channels having wavelengths $\lambda_1 \ldots \lambda_j$ and a service channel having wavelength $\lambda_{sc}$ between nodes $20_1, 20_2, 20_3 \ldots 20_N$. The payload channels carry information signals at particular data rates, for example 2.5 Gbits/s with telemetry at 2 Mbits/s. The service channel typically carries housekeeping information and does so, for example, at a lower data rate as compared to the data rates associated with the payload channels. Although FIG. 1 illustrates network 10 having a ring architecture, the principles of the invention are equally applicable to alternative network configurations.

Each node $20_1, 20_2, 20_3 \ldots 20_N$ is configured to receive wavelength $\lambda_{sc}$ associated with a service channel and one or more payload channels selected from the WDM signal having wavelengths $\lambda_1 \ldots \lambda_j$. For example, node $20_1$ may be configured to receive a payload channel having wavelength $\lambda_2$. In this case node $20_1$ would receive the WDM signal as it traverses network 10 and drops a payload channel having wavelength $\lambda_2$ from the WDM signal as well as dropping the service channel having wavelength $\lambda_{sc}$ using an add/drop multiplexer in accordance with the present invention. The payload channel having wavelength $\lambda_2$, as well as the service channel wavelength $\lambda_{sc}$ are processed at node $20_1$, combined with the remaining payload channel wavelengths $\lambda_1, \lambda_3 \ldots \lambda_j$ and carried via optical paths $30_1$ or $30_N$ depending on the intended destination within network 10. Optical paths $30_1, 30_2, 30_3 \ldots 30_N$, can be unidirectional, i.e. the optical paths carry the WDM signal within network 10 in one direction, for example clockwise in FIG. 1, utilizing a single waveguide. The optical paths $30_1, 30_2, 30_3 \ldots 30_N$ can also be configured as bidirectional where the WDM signal is carried in both clockwise and counterclockwise directions. This may be done, for example, for redundancy purposes. A bidirectional configuration requires that optical paths $30_1, 30_2, 30_3 \ldots 30_N$ include a pair of waveguides; a first waveguide capable of carrying the WDM signal in a clockwise direction and a second waveguide capable of carrying the WDM signal in a counterclockwise direction within the network.

Figure 2:
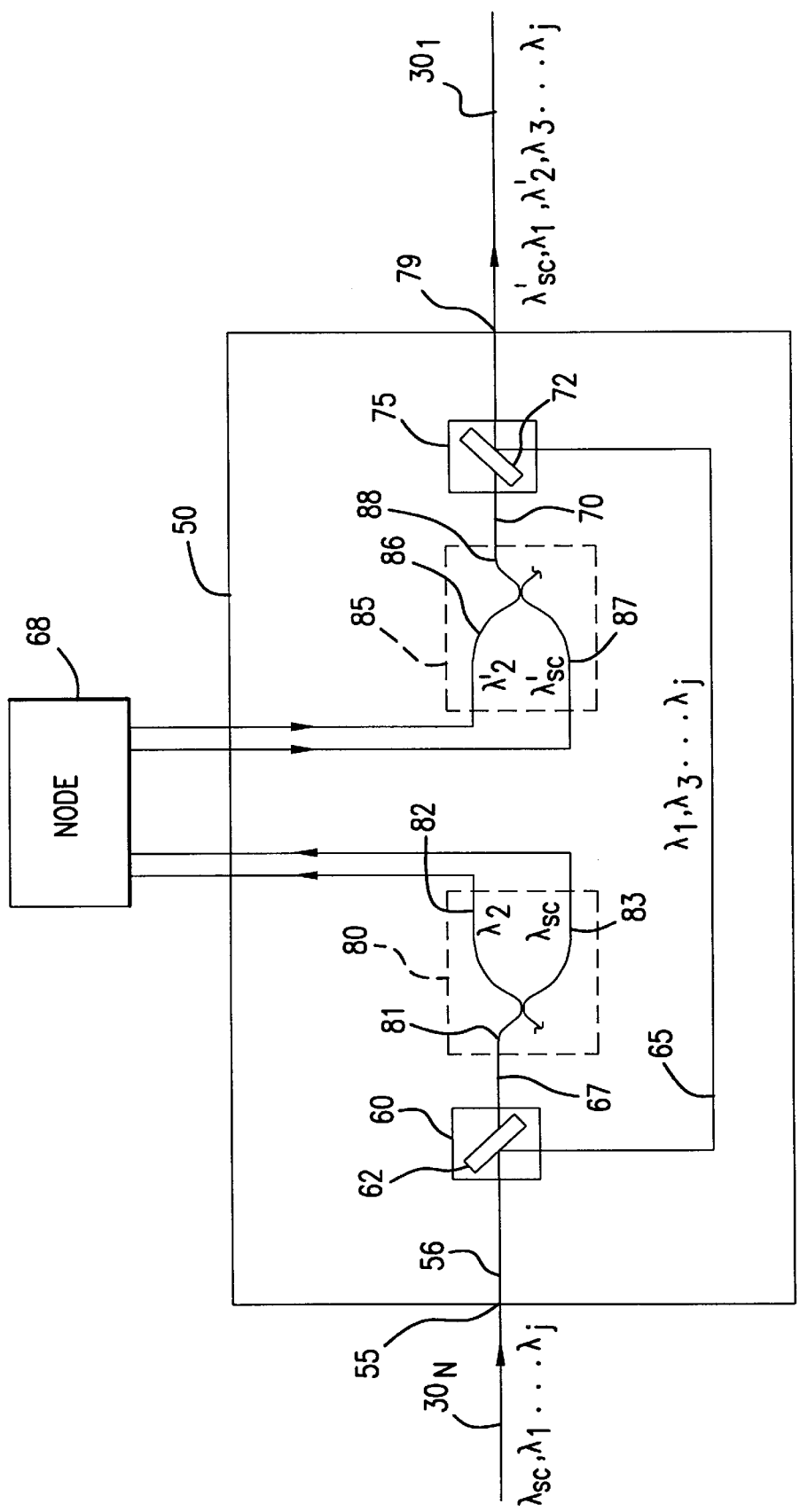
FIG. 2 illustrates a schematic diagram of an optical device in accordance with the present invention.

FIG. 2 illustrates a simplified view of an add/drop multiplexer 50 located at node $20_1$, for example, in network 10 according to one embodiment of the present inventionL It is understood that each of nodes $20_1, 20_2, 20_3 \ldots 20_N$ include an add/drop multiplexer, similar to multiplexer 50, that is configured to drop the service channel wavelength $\lambda^{sc}$ and one or more channel wavelengths $\lambda_1, \ldots \lambda_j$ from the WDM signal. Each multiplexer at the various nodes $20_1, 20_2, 20_3 \ldots 20_N$ may be configured to drop the same or different channel wavelengths $\lambda_1, \ldots \lambda_j$ from the WDM signal depending on the desired network configuration. Although the following description refers to node $20_1$ and its associated add/drop multiplexer 50, it is understood that this description can be applied to other nodes within network 10.

Add/drop multiplexer 50 is optically coupled to path $30_N$ for example, at input port 55 which receives the network WDM signal having wavelengths $\lambda_1, \ldots \lambda_j$ as well as a service channel having wavelength $\lambda_{sc}$ and is carried to first optical filter element 60 by way of transmission line 56. The transmission line, for example an optical fiber has a transmission window for the service channel wavelength $\lambda_{sc}$ in the 1310 nm range and for the payload channel having wavelength $\lambda_2$ as well as the other payload channels $\lambda_1, \lambda_3 \ldots \lambda_j$ in the 1550 nm range. Filtering element 60 includes, for example, an interference filter 62 configured to drop one or more channel wavelengths. In this example, interference filter 60 drops the WDM channel having wavelength $\lambda_2$ and the service channel having wavelength $\lambda_{sc}$. Interference filter 62 reflects the remaining channel group including wavelengths $\lambda_1, \lambda_3 \ldots \lambda_j$ onto fiber 65 for passage to a first combining element 75. In the depicted exemplary embodiment, interference filter 62 is commercially available from, for example, JDS Fitel, Inc.

Figure 3:
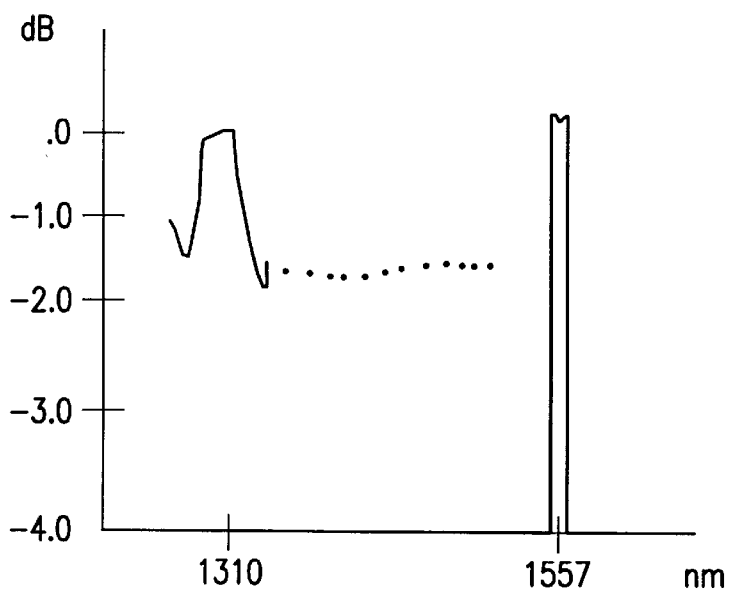
FIG. 3 illustrates a graph of transmittance (dB) and wavelength (nm) of an exemplary interference filter utilized in an optical device in accordance with the present invention.

The transmittance vs. wavelength characteristic of exemplary interference filter 62 is shown in FIG. 3. The transmittance window of interference filter 62 has a relatively high transmittance at payload channel wavelength $\lambda_2$, for example 1557 nm as well as at the service channel wavelength $\lambda_{sc}$, for example 1310 nm. In general, when interference filter 62 is tuned to particular optical channels, for example wavelengths $\lambda_2$ and $\lambda_{sc}$, the corresponding optical channels are dropped from the WDM signal. Likewise, when interference filter 62 is tuned out of an optical channel, the corresponding optical channel is a "through" channel, i.e. a channel which is transmitted unaffected through add/drop multiplexer 50. It is understood that nodes $20_1, 20_2, 20_3 \ldots 20_N$ include similar interference filters 62 which have corresponding transmittance characteristics at a service channel wavelength $\lambda_{sc}$ as well as a transmittance band for at least one payload channel wavelength $\lambda_1 \ldots \lambda_j$ within the 1550 nm range associated with the WDM signal. Through the use of filtering element 60, a single component is used to drop both a payload channel and a service channel wavelength, thereby having less of an impact to the payload loss budget within network 10 as compared with separate components for accomplishing this function.

Returning to FIG. 2, the dropped channels having wavelengths $\lambda_{sc}$ and $\lambda_2$ are transmitted from filtering element 60 to optical line 67. A first optical separator 80, an optical coupler for example, includes input port 81 and two output ports 82 and 83. Optical coupler 80 can be, for example, a fused fiber coupler. Input port 81 receives the combined dropped payload channel having wavelength $\lambda_2$ and the service channel having wavelength $\lambda_{sc}$ from filtering element 60 by way of fiber 67, separates the payload channel $\lambda_2$ from the service channel $\lambda_{sc}$ and outputs the respective channels on ports 82 and 83.

Outputs 82 and 83 are coupled to interface circuitry 68 located, for example at node $20_1$ which receives the separated channels $\lambda_{sc}$ and $\lambda_2$ and converts the channels into electrical signals for processing including extracting and adding information transmitted on the channels as is known in the art. Interface circuitry 68 also includes circuitry for converting the processed electrical signals to optical signals and modulating the optical channels $\lambda_2$ and $\lambda_{sc}$ with additional/different information. Alternatively, either channel $\lambda_2$ and/or $\lambda_{sc}$ may carry the same information signals as those supplied by outputs 82 and 83 depending on the particular signal transmission. The wavelengths carrying additional/different (or the same) information as that received by interface circuitry 68 are denoted as having wavelengths $\lambda'_{sc}$ and $\lambda'_2$.

A second combining element 85, for example an optical coupler, receives channels $\lambda'_2$ and $\lambda'_{sc}$ at inputs 86 and 87, respectively. Coupler 85 which can be, for example, a fused fiber coupler, combines the payload channel $\lambda'_2$ and the service channel $\lambda'_{sc}$ and supplies the combined signal to output 88. Combining element 75 is coupled to line 70 for receiving the channel wavelengths $\lambda'_2$ and $\lambda'_{sc}$ as well as being coupled to optical fiber 65 for receiving channel wavelengths $\lambda_1, \lambda_3 \ldots \lambda_j$. Combining element 75 includes, for example, an interference filter 72 configured to combine the channels received from optical lines 65 and 70. Interference filter 72 is coupled to optical path $30_1$ by way of output port 79 where optical path $30_1$ carries $\lambda_1, \lambda'_2, \lambda_3 \ldots \lambda_j$ and $\lambda'_{sc}$. In this manner, add/drop multiplexer 50 uses optical filter elements 60 and 75 to drop and add, respectively, at least one payload channel having a wavelength $\lambda_2$ and a service channel having wavelength $\lambda_{sc}$, thereby reducing the component impact on the loss budget for network 10.

Alternatively, the properties of filters 62 and 72 can be altered to choose which of the WDM and service channel wavelengths are reflected and which are dropped within add/drop multiplexer 50. For example, the properties of filter 62 can be configured such that the channels dropped by filter 62, in the above example, are $\lambda_1$, $\lambda_3$ . . . $\lambda_j$. The payload channel wavelength $\lambda_2$ and service channel wavelength $\lambda_{sc}$ would be the reflected channels. Likewise, filter 72 can be configured to receive $\lambda_2'$ and $\lambda_{sc}'$ and add them to dropped channels $\lambda_1$, $\lambda_3$ . . . $\lambda_j$.

Although optical filter elements 60 and 75 are shown in FIG. 2 as separate components, they can be contained within a single package. Additionally, a low loss photodetector, such as a photodiode (not shown), can be packaged with filter element 60 and used to monitor the signal received by filter element 60. An additional optical element may also be included with filter element 60 to pick-off a small fraction of the received light and direct it to the photodetector. Because this additional element has a relatively low loss associated with it, the loss corresponding to add/drop multiplexer 50 does not significantly affect the network's loss budget.

Figure 4:
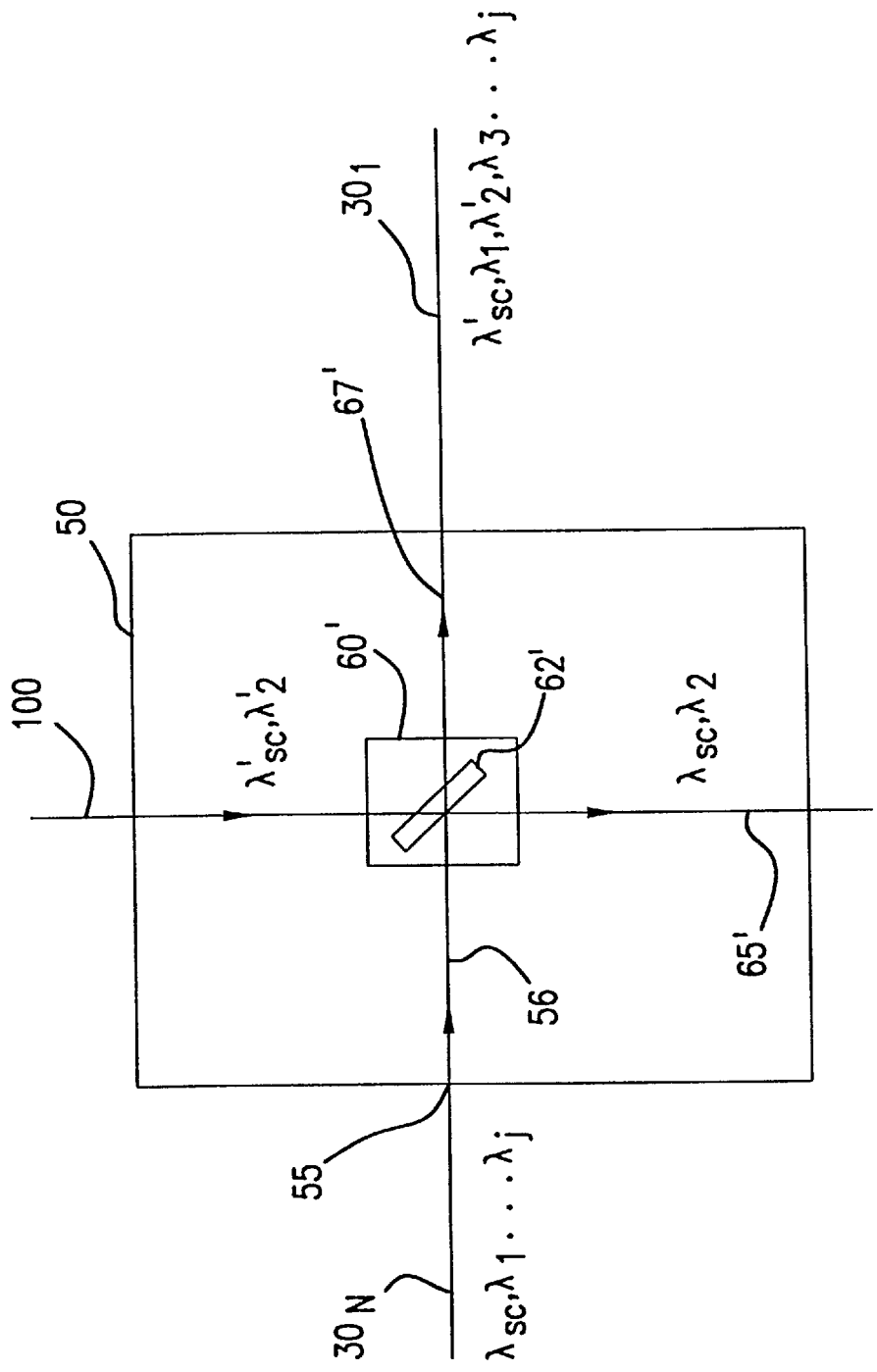
FIG. 4 is a schematic view of an alternative embodiment of an optical device in accordance with the present invention.

FIG. 4 schematically illustrates an alternative embodiment of add/drop multiplexer 50 which includes a filtering element 60' configured to both drop and add a service channel and a payload channel as well as reflecting the remaining channel group. Add/drop multiplexer 50 is coupled to optical path $30_N$ at input port 55 which receives the network WDM signal having wavelengths $\lambda_1$ . . . $\lambda_j$ as well as a service channel having wavelength $\lambda_{sc}$ and supplies the signal to optical filtering element 60' by way of line 56. Filtering element 60' includes, for example, an interference filter 62' configured to drop one or more channel wavelengths selected from the WDM signal, for example $\lambda_2$, as well as the service channel wavelength $\lambda_{sc}$ and supplies these channels to output line 65'. Interference filter 62' also receives channel wavelengths $\lambda_{sc}'$ and $\lambda_2'$ via line 100 and combines these channels with the remaining channel group including, in this example, channel wavelengths $\lambda_1$, $\lambda_3$ . . . $\lambda_j$. The combined channel wavelengths $\lambda_{sc}'$, $\lambda_1$, $\lambda_2'$, $\lambda_3'$, . . . $\lambda_j$ are supplied to output line 67' of add/drop multiplexer 50 which is coupled to optical path $30_1$. Alternatively, the properties of filter 62' can be altered to choose which of the WDM and service channel wavelengths are reflected and which are dropped within add/drop multiplexer 50.

Figure 5:
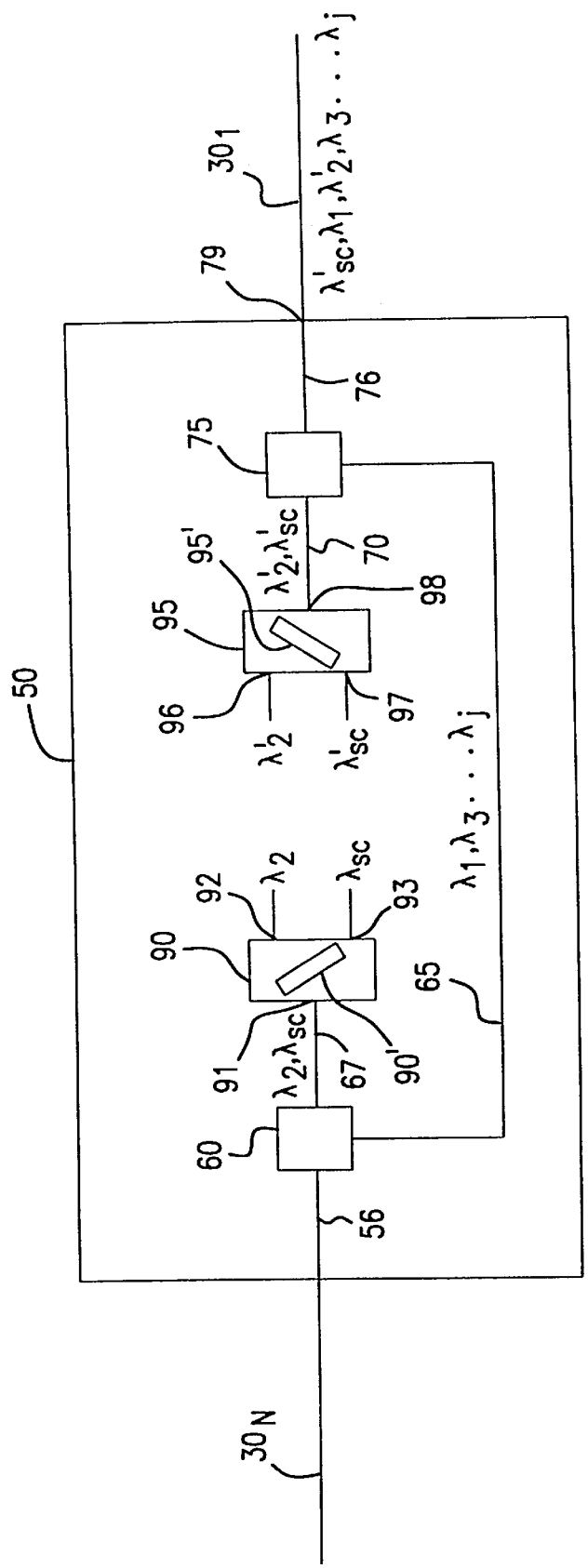
FIG. 5 is a schematic view of an alternative embodiment of an optical device in accordance with the present invention.

FIG. 5 schematically illustrates another embodiment of the add/drop multiplexer 50 which includes filter elements 90 and 95 for separating and combining, respectively, the payload channel wavelength $\lambda_2$ and the service channel having wavelength $\lambda_{sc}$. Separator element 90 includes interference filter 90', input port 91 and output ports 92 and 93. Input port 91 receives the combined dropped payload channel $\lambda_2$ and the service channel having wavelength $\lambda_{sc}$ from filtering element 60 by way of line 67. Interference filter 90' separates the dropped payload channel $\lambda_2$ from the service channel having wavelength $\lambda_{sc}$ and outputs the channels on ports 92 and 93, respectively. The payload channel wavelength $\lambda_2$ and the service channel wavelength $\lambda_{sc}$ are processed by external circuitry (not shown) and represented by $\lambda_2'$ and $\lambda_{sc}'$.

Multiplexer 50 receives channels $\lambda_2'$ and $\lambda_{sc}'$ and their associated information signals, at inputs 96 and 97 of second combining element 95. The payload channel $\lambda_2'$ and the service channel $\lambda_{sc}'$ are combined by interference filter 95' included in combining element 95, output at port 98 and carried to first combining element 75 by way of fiber 70. Combining element 75 is coupled to line 70 and receives the channel wavelengths $\lambda_2'$ and $\lambda_{sc}'$. Combining element 75 is also coupled to optical fiber 65 for receiving the remaining channel group including, in this example, channel wavelengths $\lambda_1$, $\lambda_3$ . . . $\lambda_j$. Combining element 75 includes an interference filter 72 configured to combine the channels received from optical lines 65 and 70. Interference filter 72 is coupled to optical path $30_1$ by way of output port 79 where optical path $30_1$ carries $\lambda_1$, $\lambda_2'$, $\lambda_3$ . . . $\lambda_j$ and $\lambda_{sc}'$.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical device comprising:
   a transmission path carrying an optical signal having a plurality of channels including a service channel;
   an optical filtering element having an input, and first and second outputs, said input coupled to said first transmission path for receiving said optical signal, said first output carrying at least one of said plurality of optical channels and said service channel, and said second output carrying at least a second one of said plurality of optical channels; and
   an optical combining element having a first port for receiving said one of said plurality of optical channels and said service channel, said optical combining element having a second port coupled to said second output of said optical filtering element and receiving said second one of said plurality of optical channels, said optical combining element having a third port configured to output said one of said plurality of optical channels, said service channel and said second one of said plurality of optical channels.

2. An optical device in accordance with claim 1 further comprising an optical separator coupled to said first output of said optical filtering element, said optical separator being configured to separate said one of said plurality of optical channels from said service channel.

3. An optical device in accordance with claim 2 wherein said separator comprises an optical coupler.

4. An optical device in accordance with claim 2 wherein said separator comprises an interference filter.

5. An optical device in accordance with claim 2 wherein said optical separator comprises a fused fiber coupler.

6. An optical device in accordance with claim 1 wherein said optical combining element is a first optical combining element, said optical device further comprising a second optical combining element being configured to combine said one of said plurality of optical channels and said service channel, said second combining element having an output coupled to said first port of said first optical combining element for supplying said combined one of said plurality of optical channels and said service channel.

7. An optical device in accordance with claim 6 wherein said one of said plurality of optical channels received at said input of said optical filtering element carries a first set of information and said service channel received at said input of said optical filtering element carries a second set of information, said one of said plurality of optical channels received by said second combining element carries a third set of information and said service channel received by said second combining element carries a fourth set of information.

8. An optical device in accordance with claim 6 wherein said second optical combining element comprises an interference filter.

9. An optical device in accordance with claim 6 wherein said second optical combining element comprises an optical coupler.

10. An optical device in accordance with claim 6 wherein said second optical combining element comprises a fused fiber coupler.

11. An optical device in accordance with claim 1 wherein said optical filter element comprises an interference filter.

12. An optical device in accordance with claim 1 wherein said optical combining element comprises an interference filter.

13. An optical device in accordance with claim 1 wherein said one of said plurality of optical channels and said second one of said plurality of optical channels carry information at a first data rate and said service channel carries information at a second data rate.

14. An optical device in accordance with claim 13 wherein said first data rate is higher than said second data rate.

15. An optical device in accordance with claim 1 wherein said transmission path comprises an optical waveguide medium having a transmission window.

16. An optical device in accordance with claim 15 wherein said transmission window is centered at about 1310 nm.

17. An optical device in accordance with claim 15 wherein said transmission window is centered at about 1550 nm.

18. An optical device comprising:

a transmission path carrying an optical signal having a plurality of channels including a service channel;

an optical filtering element having a first input, a second input and a first output and a second output, said first input coupled to said first transmission path for receiving said optical signal, said first output supplying at least one of said plurality of optical channels carrying a first set of information and said service channel carring a second set of information, said second input receiving said at least one of said plurality of optical channels carrying a third set of information and said service channel carrying a fourth set of information, said second output carrying a second one of said plurality of optical channels, said at least one of said plurality of optical channels carrying said third set of information and said service channel carrying said fourth set of information.

19. An optical device in accordance with claim 18 wherein said optical filtering element comprises an interference filter.

20. An optical communications network comprising:

a plurality of optical transmission paths, each of said paths carrying an optical communication signal having a plurality of payload channels and a service channel, each of said channels having respective wavelengths; and a plurality of add/drop nodes coupled to said optical transmission paths for receiving said communication signal, each of said nodes including an optical filtering element having an input, and a first and second output, said input coupled to said first transmission path for receiving said optical signal, said first output carrying at least one of said plurality of payload channels and said service channel, and said second output carrying a second ones of said plurality of payload channels.

21. A communications network in accordance with claim 20 wherein said plurality of nodes is configured in a ring architecture.

22. A system in accordance with claim 20 wherein said optical filtering element comprises an interference filter.

23. An optical device comprising:

a transmission path carrying multiplexed optical signals, said multiplexed signals having a first passband associated with payload channels and a second passband associated with a service channel, each of said channels at a respective wavelength; and an optical filtering unit coupled to said transmission path for receiving said multiplexed optical signals, said filtering unit configured to select at least one of said channels within said first and second passbands, said filtering unit having a first port for outputting said at least one of said channels within said first passband and a second port for outputting said at least one of said channels within said second passband.

24. An optical device in accordance with claim 23 wherein said channels within said first passband is centered at about 1.5 $\mu$m.

25. An optical device in accordance with claim 23 wherein said channels within said second passband is centered at about 1.3 $\mu$m.

26. An optical device in accordance with claim 23 wherein said channels within said second passband is centered at about 1.6 $\mu$m.

* * * * *